United States Patent
Eul et al.

(10) Patent No.: US 11,598,054 B2
(45) Date of Patent: Mar. 7, 2023

(54) ROAD FINISHING MACHINE WITH INDIRECT LIGHTING OF A WORKING AREA

(71) Applicant: JOSEPH VOEGELE AG, Ludwigshafen/Rhein (DE)

(72) Inventors: Achim Eul, Mannheim (DE); Michael Heindtel, Mannheim (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 0 days.

(21) Appl. No.: 17/179,792

(22) Filed: Feb. 19, 2021

(65) Prior Publication Data

US 2021/0262178 A1   Aug. 26, 2021

(30) Foreign Application Priority Data

Feb. 20, 2020 (EP) ..................... 20158499

(51) Int. Cl.
*E01C 19/42* (2006.01)
*F21S 41/147* (2018.01)
(Continued)

(52) U.S. Cl.
CPC ............... *E01C 19/42* (2013.01); *B60Q 1/24* (2013.01); *F21S 41/147* (2018.01); (Continued)

(58) Field of Classification Search
CPC ....... B60Q 1/24; E01C 19/42; E01C 2301/00; E01C 2301/30; F21S 41/147; (Continued)

(56) References Cited

U.S. PATENT DOCUMENTS 6,257,737 B1 * 7/2001 Marshall ................... F21V 7/30
                                                            362/231
8,950,803 B2    2/2015 Herzberg et al.
(Continued)

FOREIGN PATENT DOCUMENTS

CN       104428585 A     3/2015
CN       106400658 A     2/2017
(Continued)

OTHER PUBLICATIONS

European Search Report dated Aug. 6, 2020, Application No. 20158499.2-1002, Applicant Joseph Voegele AG, 8 Pages.
Chinese Office Action (with English Translation) dated Apr. 26, 2022, Application No. 202110188105.4, 12 Pages.

*Primary Examiner* — Jason M Han
(74) *Attorney, Agent, or Firm* — Brooks Kushman P.C.

(57) ABSTRACT

A road finishing machine comprises a tractor and a screed hinged to the tractor to be towed behind the tractor. At the tractor, a main control platform of the road finishing machine is provided which offers space for an operator and comprises operational controls for controlling functions of the road finishing machine. The main control platform has a roof, wherein a lighting unit with a light source is provided at the roof. The lighting unit comprises a housing which accommodates the light source and has a reflector. The reflector is configured to reflect light emitted by the light source into a working area of the screed so that the working area of the screed is illuminated indirectly.

21 Claims, 2 Drawing Sheets

(51) Int. Cl.
*F21S 41/153* (2018.01)
*F21S 41/32* (2018.01)
*F21S 41/20* (2018.01)
*B60Q 1/24* (2006.01)
*F21Y 115/10* (2016.01)
*F21W 102/17* (2018.01)
*F21W 107/10* (2018.01)

(52) U.S. Cl.
CPC ........... *F21S 41/153* (2018.01); *F21S 41/285* (2018.01); *F21S 41/321* (2018.01); *E01C 2301/00* (2013.01); *E01C 2301/30* (2013.01); *F21W 2102/17* (2018.01); *F21W 2107/10* (2018.01); *F21Y 2115/10* (2016.08)

(58) Field of Classification Search
CPC ............... F21S 41/153; F21S 41/285; F21S 41/30–365; F21W 2102/17; F21W 2107/10; F21Y 2115/10
See application file for complete search history.

(56) References Cited

U.S. PATENT DOCUMENTS

| | | | |
|---|---|---|---|
| 9,458,976 | B2 | 10/2016 | Krenn et al. |
| 9,616,811 | B2 * | 4/2017 | Hulse ................. B60Q 1/52 |
| 9,963,838 | B2 | 5/2018 | Oettinger |
| 10,087,588 | B2 | 10/2018 | Buschmann et al. |
| 10,662,595 | B2 | 5/2020 | Buschmann et al. |
| 10,745,867 | B2 | 8/2020 | Weber et al. |
| 2021/0262178 | A1 | 8/2021 | Eul et al. |

FOREIGN PATENT DOCUMENTS

| | | |
|---|---|---|
| CN | 106414852 A | 2/2017 |
| CN | 207392013 U | 5/2018 |
| CN | 2015800831 U | 2/2022 |
| DE | 20 2012 003 669 U1 | 7/2013 |
| EP | 2 650 196 A2 | 10/2013 |
| EP | 3 115 238 A1 | 1/2017 |
| EP | 3 214 223 A1 | 9/2017 |
| EP | 3 587 667 A1 | 1/2020 |

* cited by examiner

ROAD FINISHING MACHINE WITH INDIRECT LIGHTING OF A WORKING AREA

CROSS-REFERENCE TO RELATED APPLICATIONS

This application claims foreign priority benefits under 35 U.S.C. § 119(a)-(d) to German patent application number EP 20158499.2, filed Feb. 20, 2020, which is incorporated by reference in its entirety.

TECHNICAL FIELD

The disclosure relates to the lighting of a road finishing machine. In particular, the disclosure relates to lighting of a working area of a screed of a road finishing machine.

BACKGROUND

It is well known to illuminate a surrounding area of a road finishing machine to facilitate working under bad light conditions. On night construction sites, light balloons are often employed for lighting. These are complex to set up and cost-intensive.

From EP 3 214 223 A1, a road finishing machine with a working lighting for lighting a surrounding area of the road finishing machine is known. The working lighting may illuminate a foundation to be provided with a road surface by the road finishing machine. The working lighting comprises tail lamps provided at the rear of a roof of a driver stand of the road finishing machine.

There is a need for a road finishing machine with an improved lighting for a working area. There is a need for a lighting that permits a high-quality illumination of a working area of a road finishing machine. There is a need for a lighting of a road finishing machine that may be easily integrated into an on-site situation in road construction.

SUMMARY

According to the disclosure, a road finishing machine with a tractor and with a screed is provided. The screed is hinged to the tractor so as to be towed behind the tractor. At the tractor, there is provided a main control platform of the road finishing machine. The main control platform offers space for an operator and comprises operational controls for controlling functions of the road finishing machine. The main control platform has a roof. At the roof of the main control platform, a lighting unit with a light source is provided. The lighting unit comprises a housing which accommodates the light source. The housing comprises a reflector. The reflector is configured to reflect light emitted by the light source into a working area of the screed so that the working area of the screed is indirectly illuminated.

Since the lighting unit is provided at the roof of the main control platform, the lighting unit is arranged in an elevated position and is able to illuminate the working area of the screed from above. At the roof, the lighting unit is relatively far away from the ground and therefore not very susceptible to soiling. Moreover, the light source is protected from soiling or damage by the housing. By illuminating the working area of the screed, the paving operation may be more easily monitored and controlled. Since the working area of the screed is indirectly illuminated via the reflector, a blinding effect for workers and road users passing by may be reduced. By means of the reflector, a comparatively homogenous illumination of the working area of the screed may be achieved. Compared to direct illumination, the formation of shadows may be reduced.

The working area of the screed may comprise an area where the screed or a part of the screed is located. In addition or as an alternative, the working area of the screed may comprise one or more areas that are adjacent to the screed with respect to the paving direction of the road finishing machine at the front or rear, or are located in front of or behind the screed. The working area of the screed may, as an alternative or in addition, also comprise areas that are laterally adjacent to the screed or are located laterally next to the screed. It is not absolutely necessary for the complete working area of the screed to be illuminated.

The reflector may comprise a reflection face which has a reflectance of at least 0.5, or at least 0.6, or at least 0.7, or at least 0.8, or at least 0.9 for the light emitted by the light source. The reflectance indicates the ratio of the luminous power reflected by the reflection face to the luminous power striking the reflection face. The reflection face may be formed by a metal surface, in particular a polished metal surface. The reflection face may be formed by a mirror surface. A high reflectance may improve lighting efficiency.

The reflector may be configured to reflect at least 50%, or at least 60%, or at least 70%, or at least 80%, or at least 90%, or at least 95% of the light output emitted by the light source. This implies that a sufficiently high proportion of the light output emitted by the light source strikes the reflector, and the reflector moreover has a sufficiently high reflectance. If a high proportion of the light output emitted by the light source is reflected by the reflector, a high proportion of the light output is introduced into the indirect lighting of the working area of the screed.

The reflector may comprise a curved reflection face for reflecting the light emitted by the light source into the working area of the screed. By a curved reflection face, the reflected light may be particularly efficiently redirected into the working area of the screed. By a suitable selection of a curvature of the reflection face, the size and position of the illuminated area may be determined.

The reflector may be provided, at least in some areas, above the light source. From above the light source, the reflector may reflect the light emitted by the light source downwards to indirectly illuminate the working area of the screed. The reflector may be provided completely above the light source.

Preferably, a main radiation direction of the light source is upwardly inclined with respect to a horizontal direction. The main radiation direction of the light source may be a direction in which the light source radiates the highest luminous power. If the main radiation direction of the light source is upwardly inclined with respect to a horizontal direction, a blinding effect for workers and road users passing by may be clearly reduced.

The light source may be covered by the housing along a horizontal viewing direction. By this, a blinding effect of the light source for workers or road users passing by may be reduced. In particular, the reflector may cover the light source along a horizontal viewing direction. However, it would also be conceivable that a part of the housing which is not part of the reflector covers the light source along a horizontal viewing direction.

The reflector may extend from upwards at least down to the level of a bottom edge of the light source (21). Thereby, the reflector may reflect light emitted by the light source over a large angular range. Moreover, the reflector screens direct light radiated from the light source over a large angular range to reduce a blinding effect of the light source for workers or road users passing by. According to one embodiment, the reflector extends from upwards down to below the light source.

The light source may comprise a plurality of LEDs. If LEDs are used as the light source, the electric power demand of the light source may be kept low. Moreover, maintenance efforts are reduced due to the longevity of LEDs.

According to an embodiment, the LEDs of the light source may be switched separately. The LEDs of the light source may in particular be switched separately individually or in groups. By separately switchable LEDs, for example the size and/or shape of the illuminated area may be adapted. For example, the size and/or the shape of the illuminated area may be adapted corresponding to a configuration of the screed. For example, the illuminated area may be adapted to a paving width by switching on additional LEDs or switching off LEDs. The paving width may be predetermined by an operator or be automatically detected by the road finishing machine. As an alternative, it would also be conceivable that all LEDs of the light source are switchable together.

The light source may be dimmable to be able to implement various lighting intensities. By adapting the lighting intensity, a blinding effect may be reduced.

The reflector may be configured to reflect the light emitted from the light source into the working area of the screed at an angle of at least 30° or at least 35° or at least 40° or at least 45° or at least 60° with respect to a horizontal plane. By a steep angle with respect to the horizontal plane, the formation of shadows may be reduced.

The reflector may be configured to radiate light emitted from the light source into a ground area which, with respect to the paving direction of the road finishing machine, extends behind the lighting unit at most 5 m, or at most 6 m, or at most 8 m, or at most 10 m, or at most 15 m. With the limitation of the illuminated area to the rear, it is not necessary to reflect light at a flat angle with respect to a horizontal direction, so that the risk of blinding workers or road users passing by is reduced.

The lighting unit may comprise a diffusing assembly arranged in a beam path of the light emitted by the light source. With the diffusing assembly, a relatively homogenous illumination may be achieved. The diffusing assembly may be integrated into the housing of the lighting assembly. The diffusing assembly may close the housing of the lighting unit.

The diffusing assembly may comprise, for example, a prism or a diffusing screen.

The lighting unit may be configured to selectively provide a working lighting for illuminating the working area of the screed, or provide an emergency lighting with reduced light output compared to the working lighting. The working lighting may be used during a paving operation to monitor the working area of the screed. The emergency lighting with reduced light output may be used, for example, before or after the paving operation to facilitate entering the main control platform or leaving the main control platform in darkness.

According to an embodiment, the emergency lighting is provided by the same light source as the working lighting. To this end, the light source could be, for example, dimmable, or it could be possible to only activate a part of the light source. According to another embodiment, a further light source is integrated in the lighting unit to provide the emergency lighting.

Preferably, the lighting unit is attached to the roof of the main control platform as a module. By this, mounting and demounting of the lighting unit are facilitated. Moreover, no cumbersome adjustment of the lighting unit is required any longer during mounting of the lighting unit, if the lighting unit in total was preadjusted or oriented as a module. The module may be detachable from the road finishing machine as a unit.

BRIEF DESCRIPTION OF THE DRAWINGS

Below, the disclosure will be further illustrated by way of exemplary embodiments with reference to the Figures.

DETAILED DESCRIPTION

Figure 1:
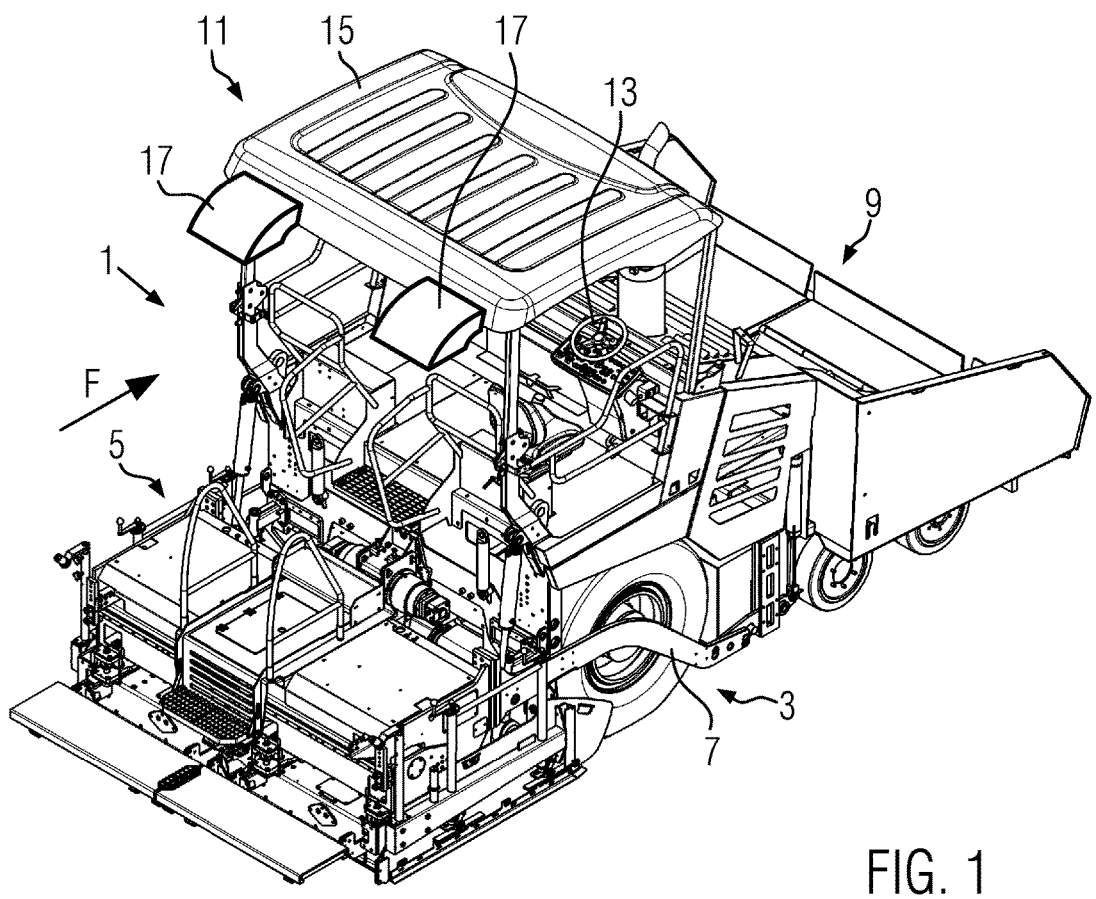
FIG. 1 shows a schematic perspective view of a road finishing machine according to an embodiment.

FIG. 1 shows, in a schematic perspective view, a road finishing machine 1 according to an embodiment. The road finishing machine 1 comprises a tractor 3 and a screed 5. The screed 5 is hinged to the tractor 3 by tow bars 7 and is towed behind the tractor 3 in the paving direction F. At the front at the tractor 3 with respect to the paving direction F, a material bunker 9 for receiving paving material is provided. In operation, paving material is transported from the material bunker 9 via a conveying assembly (not illustrated) to a rear region of the road finishing machine 1 and is placed in front of the screed 5 for compacting.

At the tractor 3, a main control platform 11 of the road finishing machine 1 is provided. The main control platform 11 offers space for an operator and comprises operational controls 13 for controlling functions of the road finishing machine 1. For example, via the operational controls 13, the driving functions of the road finishing machine 1 may be controlled and paving parameters may be adjusted. The main control platform 11 has a roof 15 which protects the operator from sun and weather. At the rear of the roof 15, two lighting units 17 are provided. However, it would also be conceivable to only provide one lighting unit 17 or more than two lighting units 17.

Figure 2:
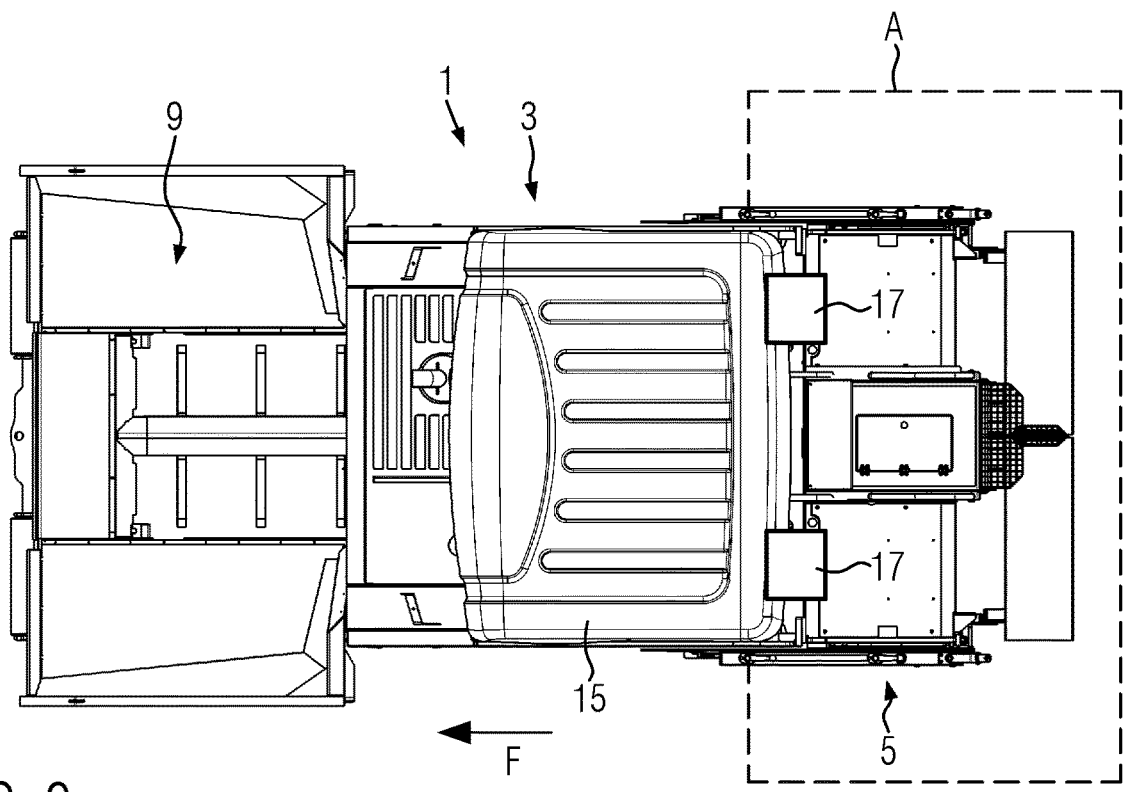
FIG. 2 shows a schematic plan view of the road finishing machine according to the embodiment.

In the illustrated embodiment, the two lighting units 17 are identically configured. The lighting units 17 are configured to illuminate a working area A of the screed 5. An example of a working area A of the screed 5 is illustrated in FIG. 2. The working area A is an area where the screed 5 is present and/or which extends in front of and/or behind and/or laterally of the screed 5. By illumination of the working area A of the screed 5, the working area A of the screed 5 may be monitored by the driver of the finishing machine or another worker even in darkness to ensure that the paving operation is performed properly.

In the illustrated embodiment, the working area A of the screed 5 is shown as a rectangle around the screed 5. It will be appreciated that the working area A of the screed 5 is not restricted to this geometry or positioning. It would be conceivable, for example, that the illuminated area extends beyond the screed 5 only to the rear, but not to the front.

Figure 3:
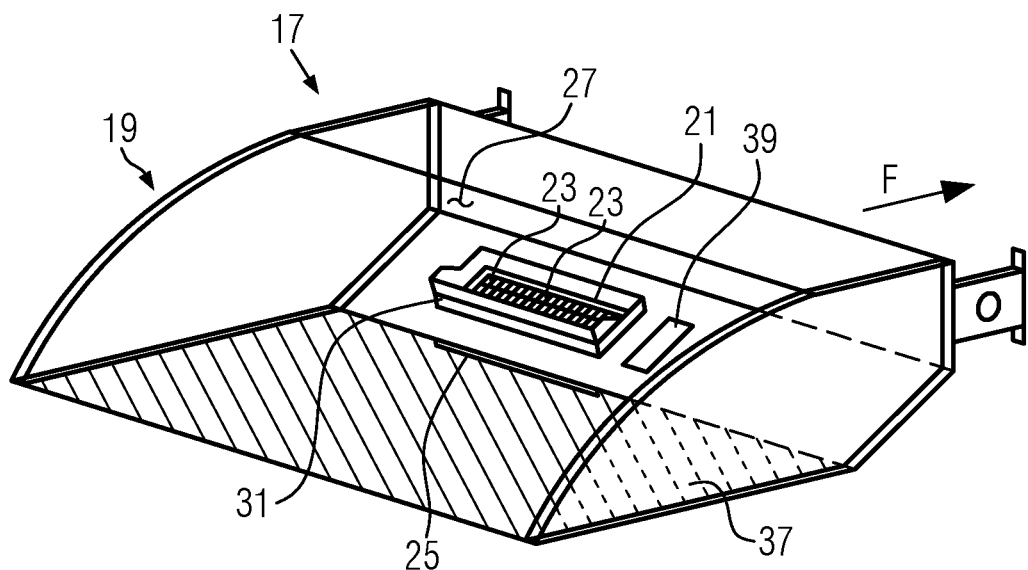
FIG. 3 shows a schematic perspective view of a lighting unit of the road finishing machine according to the embodiment.

FIG. 3 shows one of the two lighting units 17 in a schematic perspective view. The lighting unit 17 comprises a housing 19 which is shown in a transparent manner in FIG. 3 for a better overview. The housing 19 accommodates a light source 21. In the illustrated embodiment, the light source 21 comprises a plurality of LEDs 23. The lighting unit 17 comprises an interface 25 to connect it to a power supply of the road finishing machine 1 and to connect it to a controller of the road finishing machine 1.

The light source 21 is upwardly inclined with respect to a horizontal direction. The light source 21 is arranged such that a main radiation direction of the light source 21 is upwardly inclined with respect to a horizontal direction. The lighting unit 17 comprises a reflector 27 which reflects light emitted from the light source 21 into the working area A of the screed 5, so that the working area A of the screed 5 is illuminated indirectly. In the illustrated embodiment, the reflector 27 forms a part of the housing 19. However, it would also be conceivable that the reflector 27 is attached within the housing 19 as a separate element. In the illustrated embodiment, the reflector 27 comprises a curved reflection face 29 for reflecting the light emitted by the light source 21 (see FIG. 4). The reflector 27 is provided in some areas above the light source 21 and extends downwards to below the light source 21 along a rearward direction opposite to the paving direction F. As can be easily seen in FIGS. 3 and 4, due to the geometry of the housing 19 or the reflector 27, the light source 21 is covered along a horizontal viewing direction. The housing 19 and/or the reflector 27 prevent a worker standing behind or next to the road finishing machine 1 or a road user passing by from directly looking into the light source 21 and being blinded in this way. In the illustrated embodiment, a screening assembly 31 is moreover provided within the housing 19 around the light source 21 to offer further protection against blinding of a worker or a road user passing by.

Figure 4:
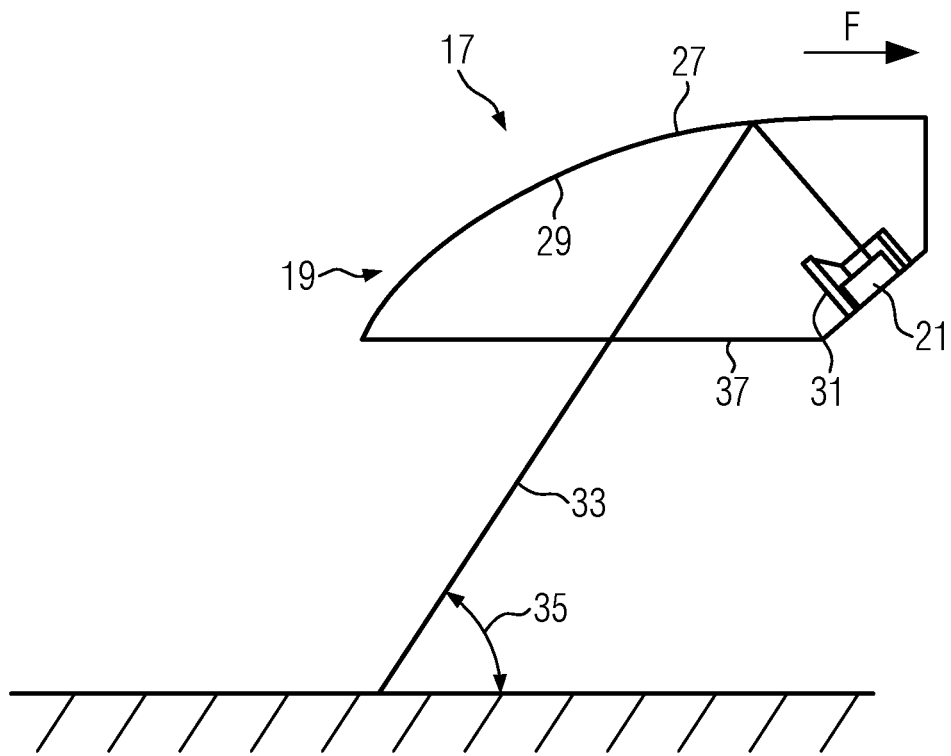
FIG. 4 shows a schematic sectional view of the lighting unit according to the embodiment in a side view.

FIG. 4 schematically shows the beam path of a light beam 33 emitted by the light source 21. The light beam 33 is initially emitted by the light source 21 in a direction obliquely facing rearwards and upwards. The light beam 33 strikes the reflection face 29 of the reflector 27 and is reflected from there to be reflected into the working area A of the screed 5 at an angle 35 with respect to a horizontal plane. The angle 35 is defined here as the smaller one of the two angles which the light beam 33 forms with the horizontal plane. The angle 35 is preferably at least 30°, or at least 35°, or at least 40°, or at least 45°, or at least 60°.

The lighting unit 17 furthermore comprises a diffusing assembly 37 that is arranged in the beam path of the light emitted from the light source 21. The diffusing assembly 37 may comprise, for example, a diffusing screen. As an alternative or in addition, the diffusing assembly 37 could comprise a prism. In the illustrated embodiment, the diffusing assembly 37 is embodied as a plate-like element which closes the housing 19. It would, however, also be conceivable that the diffusing assembly 37 is provided within or outside the housing 19. With the diffusing assembly 37, a homogenous light distribution is ensured. Moreover, a blinding effect may be further reduced.

As can be seen in the figures, the lighting unit 17 is provided as a module which is attached to the roof 15 of the main control platform 11 of the road finishing machine 1. The module may initially be completely assembled and then fixed to the roof 15 as a whole. The lighting unit 17 may be detachable from the roof 15 as a whole.

The LEDs 23 of the light source 21 may all be switched on or off as a whole according to an embodiment. As an alternative, it would be conceivable to switch the LEDs 23 individually or in groups separately. For example, a size of the illuminated area could be adapted to a configuration or width of the screed 5. Optionally, the light source may be embodied to be dimmable to be able to implement various lighting intensities.

According to an embodiment, the lighting unit 17 may work in two different operating modes. In an operating mode for providing a working lighting, the lighting unit 17 may, as described, be operated to illuminate the working area A of the screed 5. In an operating mode for providing an emergency lighting, the lighting unit 17 may provide a light output that is reduced compared to the working lighting, which may be used, for example, to facilitate the entering the main control platform 11 or leaving the main control platform 11 for the operator in darkness. The emergency lighting may be provided using LEDs 23 which also contribute to the provision of the working lighting. As an alternative, it would be conceivable to provide a separate light source 39 for the emergency lighting (see FIG. 3). The separate light source 39 is preferably also a part of the lighting unit 17 and may in particular be provided at or in the housing 19.

What is claimed is:

1. A road finishing machine comprising:
a tractor;
a screed hinged to the tractor to be towed behind the tractor;
a main control platform of the road finishing machine provided at the tractor, the main control platform offering space for an operator and comprising operational controls for controlling functions of the road finishing machine, the main control platform further having a roof; and
a lighting unit with a light source provided at the roof, wherein the lighting unit comprises a housing which accommodates the light source directed upwardly towards a reflector, wherein the reflector is configured to reflect light emitted by the light source downwardly into a working area of the screed, so that the working area of the screed is illuminated indirectly, and wherein the light source comprises a plurality of LEDs that are separately switchable to adapt a size and/or a shape of an illuminated area corresponding to a configuration of the screed.

2. The road finishing machine according to claim 1, wherein the reflector is configured to reflect at least 50% of light output emitted by the light source.

3. The road finishing machine according to claim 1, wherein the reflector is configured to reflect at least 70% of light output emitted by the light source.

4. The road finishing machine according to claim 1, wherein the reflector is configured to reflect at least 90% of light output emitted by the light source.

5. The road finishing machine according to claim 1, wherein the reflector comprises a curved reflection face for reflecting the light emitted by the light source into the working area of the screed.

6. The road finishing machine according to claim 1, wherein the reflector is provided above the light source at least in some areas.

7. The road finishing machine according to claim 1, wherein a main radiation direction of the light source is upwardly inclined with respect to a horizontal direction.

8. The road finishing machine according to claim 1, wherein the light source is covered by the housing along a horizontal viewing direction.

9. The road finishing machine according to claim 1, wherein the reflector extends from upwards at least down to a level of a bottom edge of the light source.

10. The road finishing machine according to claim 1, wherein the light source is dimmable.

11. The road finishing machine according to claim 1, wherein the reflector is configured to reflect the light emitted by the light source into the working area of the screed at an angle of at least 30° with respect to a horizontal plane.

12. The road finishing machine according to claim 1, wherein the reflector is configured to reflect the light emitted by the light source into the working area of the screed at an angle of at least 60° with respect to a horizontal plane.

13. The road finishing machine according to claim 1, wherein the reflector is configured to radiate light emitted by the light source into a ground area which extends, with respect to a paving direction of the road finishing machine, at most 5 m behind the lighting unit.

14. The road finishing machine according to claim 1, wherein the reflector is configured to radiate light emitted by the light source into a ground area which extends, with respect to a paving direction of the road finishing machine, at most 15 m behind the lighting unit.

15. The road finishing machine according to claim 1, wherein the lighting unit comprises a diffusing assembly which is arrangeable in a beam path of the light emitted by the light source.

16. The road finishing machine according to claim 15, wherein the diffusing assembly comprises a prism and/or a diffusing screen.

17. The road finishing machine according to claim 1, wherein the lighting unit is configured to selectively provide a working lighting for illuminating the working area of the screed or an emergency lighting with reduced light output compared to the working lighting.

18. The road finishing machine according to claim 1, wherein the lighting unit is attached at the roof of the main control platform as a module.

19. A road finishing machine comprising:
a tractor;
a screed hinged to the tractor to be towed behind the tractor;
a main control platform of the road finishing machine provided at the tractor, the main control platform offering space for an operator and comprising operational controls for controlling functions of the road finishing machine, the main control platform further having a roof; and
a lighting unit including a light source provided at the roof, wherein the lighting unit comprises a housing which accommodates the light source directed upwardly towards a reflector, wherein the reflector is configured to reflect light emitted by the light source downwardly into a working area of the screed, so that the working area of the screed is illuminated indirectly, wherein the lighting unit is attached at the roof of the main control platform as a module, wherein the lighting unit comprises an interface to connect the lighting unit to a power supply of the road finishing machine and to connect the lighting unit to a controller of the road finishing machine, wherein the light source is mounted on an inclined surface of the housing, and the lighting unit further comprises a screening assembly around the light source, wherein the screening assembly includes a first portion at an upper end of the light source, and a second portion at a lower end of the light source, and wherein the first portion has a first height, and the second portion has a second height that is greater than the first height.

20. The road finishing machine according to claim 19, wherein the lighting unit comprises an additional light source in the housing, and the lighting unit is operable in first and second operating modes, wherein in the first operating mode, the lighting unit is configured to provide a working lighting with the light source to illuminate the working area of the screed, and in the second operating mode, the lighting unit is configured to provide emergency lighting with the additional light source and at a light output that is reduced compared to the working lighting.

21. A road finishing machine comprising:
a tractor;
a screed hinged to the tractor to be towed behind the tractor;
a main control platform of the road finishing machine provided at the tractor, the main control platform offering space for an operator and comprising operational controls for controlling functions of the road finishing machine, the main control platform further having a roof; and
a lighting unit including a light source provided at the roof, wherein the lighting unit comprises a housing which accommodates the light source directed upwardly towards a reflector, wherein the reflector is configured to reflect light emitted by the light source downwardly into a working area of the screed, so that the working area of the screed is illuminated indirectly, wherein the light source is mounted on an inclined surface of the housing, and the lighting unit further comprises a screening assembly around the light source, wherein the screening assembly includes a first portion at an upper end of the light source, and a second portion at a lower end of the light source, and wherein the first portion has a first height, and the second portion has a second height that is greater than the first height.

* * * * *